United States Patent

[19]

Jeong

[11] Patent Number: 5,912,628
[45] Date of Patent: Jun. 15, 1999

[54] SIGNAL LINK SELECTION METHOD IN EXCHANGE SYSTEM

[75] Inventor: Ji-Woo Jeong, Seoul, Rep. of Korea

[73] Assignee: SamSung Electronics Co., Ltd., Suwon, Rep. of Korea

[21] Appl. No.: 08/767,436

[22] Filed: Dec. 16, 1996

[30] Foreign Application Priority Data

Dec. 15, 1995 [KR] Rep. of Korea ...... 95-50729

[51] Int. Cl.⁶ ............... H03K 17/30
[52] U.S. Cl. ........... 340/825.03; 455/528; 455/464; 455/450; 370/341; 379/221
[58] Field of Search ............. 340/825.03, 825; 455/528, 464, 450, 447, 453, 445; 370/341; 379/219, 220, 221; 1/1

[56] References Cited

U.S. PATENT DOCUMENTS

| | | | |
|---|---|---|---|
| 4,622,695 | 11/1986 | Whiting | 455/528 |
| 5,396,648 | 3/1995 | Patsiokas et al. | 455/34.1 |
| 5,448,751 | 9/1995 | Takenaka et al. | 455/450 |
| 5,455,569 | 10/1995 | Sherman et al. | 370/341 X |
| 5,504,939 | 4/1996 | Mayrand et al. | 455/34.1 |
| 5,561,842 | 10/1996 | Ritter et al. | 455/33.1 |
| 5,566,358 | 10/1996 | Obayshi et al. | 455/54.1 |
| 5,629,942 | 5/1997 | Zijderhand | 370/341 |
| 5,715,295 | 2/1998 | Yamashita | 1/1 |
| 5,737,358 | 4/1998 | Ritz et al. | 370/341 X |

OTHER PUBLICATIONS

Documentation regarding Signaling System No. 7 referred to in the ITU spec. No. 6, pp. 128, 129 and 130. Fascicle, V1.7–Rec. Q. 704, including discussing signaling link selection (SLS). No Mon/Yr.

Primary Examiner—Brian Zimmerman
Assistant Examiner—William H. Wilson, Jr.
Attorney, Agent, or Firm—Robert E. Bushnell, Esq.

[57] ABSTRACT

A signal link selection method between exchange systems having a plurality of signal links of a destination exchange comprises the steps of obtaining a total number of signal links and a total link list, obtaining a number of unavailable signal links, obtaining a total number of available links by subtracting the number of unavailable links from the total link number, obtaining a first link number comprising a remainder obtained by dividing a signal link selection (SLS) value of a signal message (i.e., the decimal (numerical) equivalent of the binary code for the signal message) by the total link number, checking whether the first link is available, selecting the first link if it is available, and outputting a message. If the first link is not available, the method further comprises the steps of obtaining a second link number comprising a remainder obtained by dividing the first link number by the total number of available links, selecting the second link, and outputting a message.

19 Claims, 2 Drawing Sheets

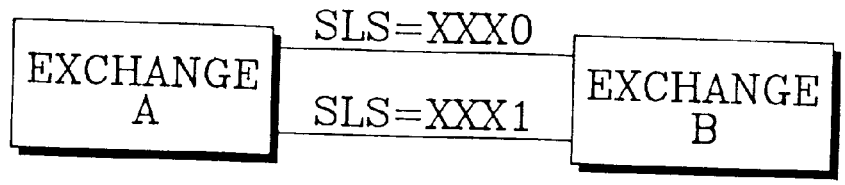
Fig. 1A *(Prior Art)*
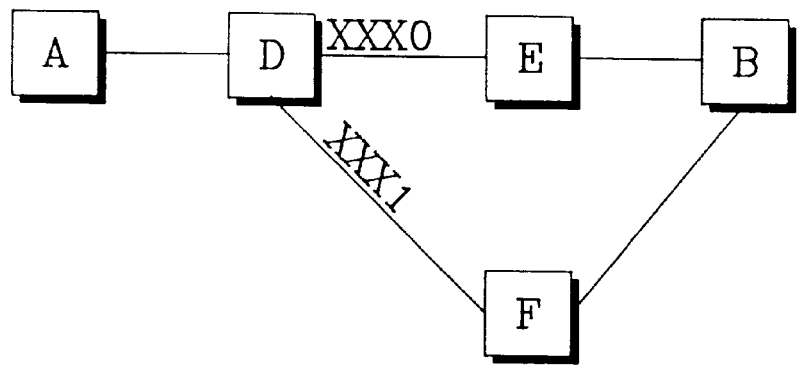
Fig. 1B *(Prior Art)*
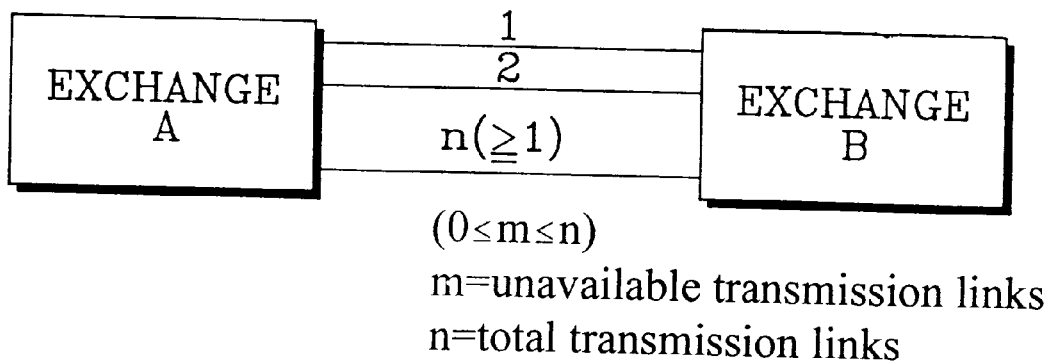
$(0 \leq m \leq n)$
m=unavailable transmission links
n=total transmission links
Fig. 2

SIGNAL LINK SELECTION METHOD IN EXCHANGE SYSTEM

CLAIM OF PRIORITY

This application makes claims all benefits accruing under 35 U.S.C. §119 from an application for SIGNAL LINK SELECTION METHOD IN EXCHANGE SYSTEM earlier filed in the Korean Industrial Property Office on Dec. 15, 1995 and there duly assigned Ser. No. 50729/1995.

BACKGROUND OF THE INVENTION

1. Field of the Invention

The present invention relates to a method of selecting a signal link in an exchange system, and more particularly to a method of transmitting a signal message when a link to transmit the signal message is selected in an exchange system.

2. Description of the Related Arts

Exchanges in communication systems require transmission links. In general, a transmission link is to be selected. The number of links between exchanges can be much greater than two, and may be variable. In such a case, signal links require special methods. Also, if a few unavailable links exist among several links, the methods should handle the unavailable links.

Among the exemplars of the contemporary practice is Obayashi et al. U.S. Pat. No. 5,566,358, Mobile Radio Communication Apparatus For Registering Location, Oct. 15, 1996) disclosing a mobile radio communication apparatus having a common channel detecting unit which judges whether or not a paging channel and an access channel which are assigned to one base station are commonly based on a predetermined parameter (CPA) which is transmitted from the base stations. If the CPA indicates a predetermined value establishing that the paging channel and the access channel are a common channel, then a memory stores information corresponding to that base station which transmits the strongest level of all the access channels received at an input of a receiver of the mobile radio communication apparatus. Ritter et al. U.S. Pat. No. 5,561,842, Mobile Radio Network, Oct. 1, 1996) endeavors to provide a ring-shaped network structure having a plurality of rings with range sections and a sector subdivision. The number of which corresponds to the number of cells positioned along a ring. Positioned in the center of a base station with antenna arranged at a raised location for illuminating all cells or for the reception from the individual cells respectively. The configuration uses a code division multiple access method. Mayrand et al. (U.S. Pat. No. 5,504,939, Communication Channel Selection In Cellular Radio Communication Systems, Apr. 2, 1996) uses a system for allocating communication channels within a cellular radio system in which each channel seizure request is assigned a call type based upon the capabilities of the mobile station, the nature of the call and the characteristics of the subscriber. A first algorithm is used to select a communication channel group for the call and a second algorithm is used to select an available communication channel from within the selected channel group. Patsiokas et al. (U.S. Pat. No. 5,396,648, Channel Acquisition Method And Apparatus For A Communication System, Mar. 7, 1995) attempts to construct a communication unit that transmits a communication channel request with the nearest base site making a communication channel grant or allocation. A base site receives the channel request signal, measures the signal strength level of the received signal, and if that level is above a threshold level, a communication channel is allocated to the requesting communication unit, thus establishing a communication link. From my study of the contemporary practice and of the art generally, I find that there is a need for an effective method and apparatus of transmitting a signal message when a link to transmit the signal message is selected in an exchange system that may use signal link selection values.

SUMMARY OF THE INVENTION

Therefore, it is an object of the present invention to provide an improved circuit and method of selecting a signal link in an exchange system.

It is another object of the present invention to provide an improved circuit and method of equally dividing a load.

It is another object of the present invention to provide an improved circuit and method of transmitting a signal message when a link to transmit the signal message is selected in an exchange system.

It is another object of the present invention to provide a circuit and method of variably selecting a signal link according to the number of variable signal links in an exchange system.

It is a further object of the present invention to provide a circuit and method of variably selecting a signal link according to the number of variable signal links in an exchange system when a signal message is transmitted.

It is another object of the present invention to provide a circuit and method of controlling selection of an unavailable signal link in an exchange system.

To accomplish one or more of the above objects, there is provided a circuit and a process for routing telecommunication traffic by selecting a signal link between exchanges, each having a plurality of signal links. They may include obtaining the total number of links for an exchange and a list of total links, obtaining a link number by a remainder obtained by dividing a signal link selection value of a signal message by said total link number, and checking whether the link having said link number is available or not. The process may also select a corresponding link if available, and generate a message via that link. The process may obtain a link number using a remainder obtained by dividing the selected link number by the total number of available links, select a corresponding link if unavailable, and generate a message via the link.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings, in which like reference symbols indicate the same or similar components, wherein:

FIGS. 1A and 1B are diagrams illustrating signal transmission processes in an exchange system performed according to contemporary practices;

FIG. 2 is a diagram illustrating a link structure between exchange systems constructed according to the principles of the present invention.

DETAILED DESCRIPTION OF THE PREFERRED EMBODIMENT

Figure 3:
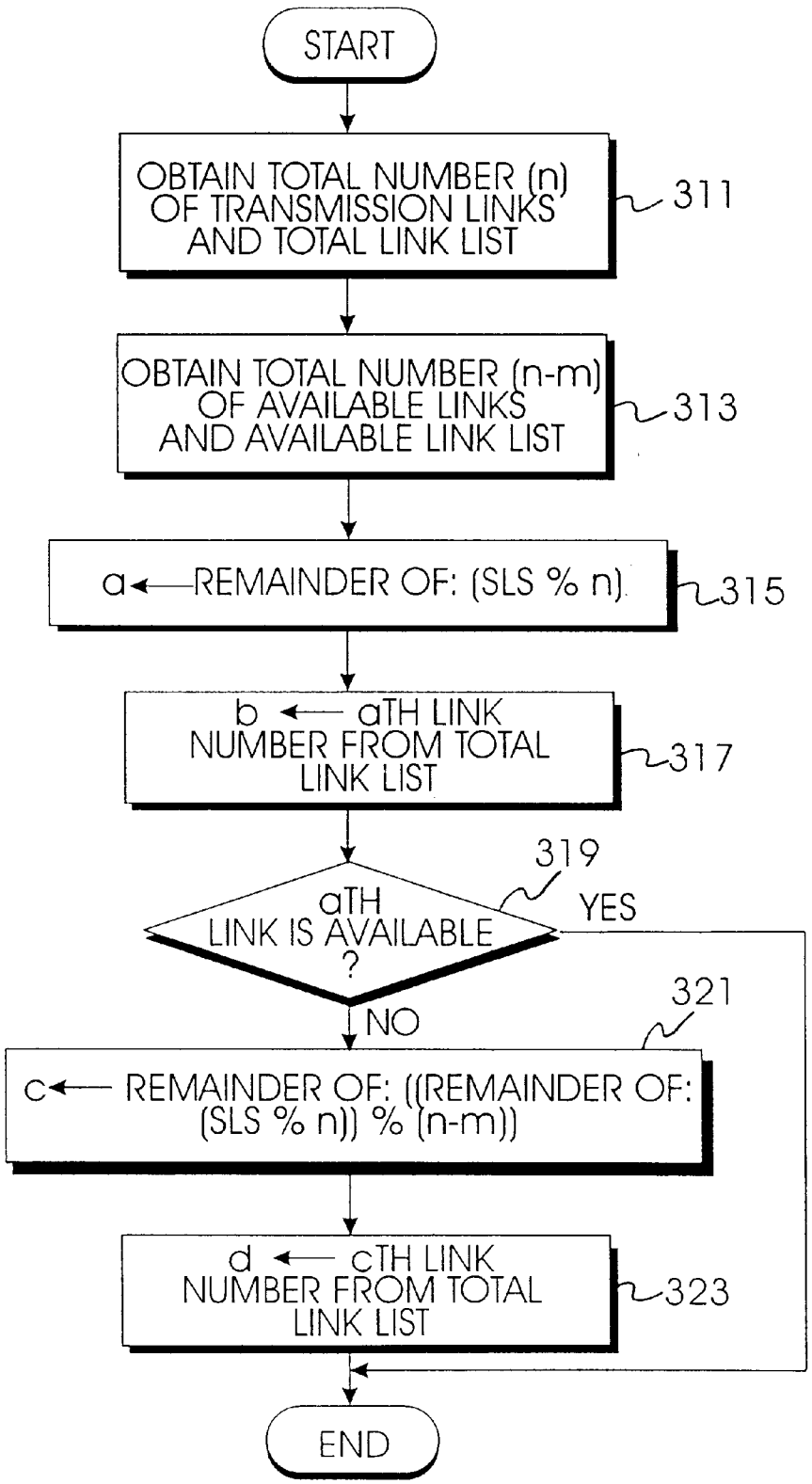
FIG. 3 is a flowchart showing an operation of selecting signal links in an exchange system according to the present invention.

Hereinbelow, a preferred embodiment of the present invention will be described in detail with reference to accompanying drawings. It should be noted that throughout the drawings, like elements are designated by like numerals.

Typically, a transmission link is selected by using a signaling link or signal link selection selection (SLS) contained in a user part message in an exchange. The SLS can be composed of four bits. FIG. 1A shows a transmission link established according to a contemporary practice illustrating such an SLS. Transmission links are between an exchange and another exchange, in which two links are selected according to the SLS value. As shown in FIG. 1A, a signal message is transmitted from an exchange A to an exchange B. In such a situation with a signal message, a link is selected with a criterion such that the remainder obtained by dividing the SLS value contained in the signal message by two is classified into two types: i.e., 0 or 1, the SLS value contained in the signal message being the decimal (numerical) equivalent of the binary code for the signal message. The message is transmitted via the selected link. As shown in FIG. 1B, in the situation of having different routes, the SLS value of the message transmitted from the exchange A to the exchange B is analyzed by an exchange D to select a signal link. Thus, the message output from the exchange A is transmitted to the exchange B via a route as shown in FIG. 1B.

As shown in FIGS. 1A and 1B, an exchange system of these contemporary practices handles only the situation of having two signal links. However, in some situations, the number of links between exchanges can be much more than two, and may be variable. In such situations, the aforementioned signal links cannot be supported by the methods as shown in FIGS. 1A and 1B. Also, if a few unavailable links exist among several links, there is no method for selecting the unavailable links.

FIG. 2 shows signal links connected between exchanges according to the present invention. The number of links between exchanges are variable. In FIG. 2, n links are connected between exchanges A and B. In the one example illustrated, the signal links shown in FIG. 2 can be connected directly between the exchanges A and B. The signal links may be connected however via another exchange. In other words, in FIG. 2, some links may be connected using other exchanges. Also, in the example illustrated FIG. 2, m links are unavailable among n links connected between the exchanges A and B, where $0 \leq m \leq n$.

FIG. 3 is a flowchart for showing a signal link selection method in an exchange system. The flow chart shows that the link selection method according to the present invention selects a link by using the values of m and n. A signal message is transmitted by the selected link.

As shown in FIG. 3, when a signal link is selected to transmit the signal message, the total number n of signal links to be connected to an exchange, i.e., a specific destination, is obtained in step 311, and then a total link list is formed by the respective link numbers. In step 313, the total number (n−m) of available links among links capable of being transmitted to the destination is obtained and then an available link list is formed by the respective link numbers. Thus, the steps 311 and 313 are steps for obtaining the total number n of the links capable of being transmitted to the exchange of a specific destination and the total number (n−m) of available links using the total link number n.

In a subsequent step, the step 315, a link number is obtained using a remainder obtained by dividing an SLS value contained in the signal message by the total link number n to store the same in a register b, the SLS value contained in the signal message being the decimal (numerical) equivalent of the binary code for the signal message. Then, in step 317, the ath link number is stored in the register b from the total link list obtained in the step 311. In the steps 315 and 317, the link number is obtained using a remainder obtained by dividing the SLS value of the signal message by n. Then, in step 319, the thus-obtained link number is used to analyze and to determine whether the ath link is available. In other words, it is checked whether the link having the link number obtained in the step 317 is available or not. Only if available, the link is decided as the one for transmitting the signal message to the corresponding link number. At this time, if it is determined that the link having the corresponding link number in the step 319 is not available, steps 321 and 323 are performed to decide a new link number.

To this end, first, in a step 321, a remainder obtained by dividing the SLS value by n is divided by the result of subtracting m from n, i.e., (n−m) to obtain another remainder, which decides the link number to then be stored in a register d. Then, in a step 323, the cTH link number is obtained from the available link list obtained in the step 313 to then be stored in the register d. The variable information stored in the register d becomes the number of a selected available link. Thus, in the step 321 and 323, if the link selected from the total link list is not available, a link is selected from the available link list. As described above, an available link is not directly detected to select a link by the two steps. This is to convert only the traffic transmitted to an unavailable link into an available link, without interrupting the traffic transmitted to available links or at least minimize the interrupting as much as possible.

As described above, if a message is transmitted to an exchange of a specific destination in an exchange network formed by a plurality of exchanges, signal links can be selected by dividing the load of a signal message efficiently, irrespective of the number of transmissible links. Also, the state of the transmissible links allows the number of unavailable links to be calculated, thereby converting the signal traffic to be transmitted thereto into available links that are capable. This lessens the load.

Therefore, it should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. A process for selecting a signal link between exchange systems potentially connectable by a plurality of signal links, comprising the steps of:

obtaining a total link number denoting a total number of signal links of a destination exchange and obtaining a total link list;

obtaining a number of unavailable signal links of said destination exchange;

obtaining a total number of available links of said destination exchange by subtracting from said total link number the number of unavailable signal links;

obtaining a first link number, said first link number being a remainder resulting from dividing a signal link selection value of a signal message by said total link number;

checking whether a corresponding link having said first link number is available; when said corresponding link having said first link number is available, selecting said corresponding link having said first link number and generating a message using said corresponding link having said first link number;

when said corresponding link having said first link number is not available, obtaining a second link number, said second link number being a remainder resulting from dividing said first link number by said total number of available links, selecting a corresponding link having said second link number, and generating a message using said corresponding link having said second link number.

2. A signal link selection method between exchange systems having a plurality of signal links, comprising the steps of:

obtaining a total link number denoting a total number of signal links of a destination exchange and a total link list;

obtaining a number of unavailable signal links of said destination exchange;

obtaining a total number of available links of said destination exchange by subtracting from said total link number the number of unavailable signal links;

obtaining a first link number, said first link number being a remainder resulting from dividing a signal link selection value of a signal message by said total link number;

checking whether a first link having said first link number is available;

if said first link having said first link number is available, selecting said first link as a selected link;

if said first link having said first link number is not available, obtaining a second link number, said second link number being a remainder resulting from dividing said first link number by said total number of available links, and selecting a second link having said second link number as said selected link; and outputting of a message using one of said first link and said second link as said selected link.

3. A signal link selection method in a communication signal exchange system, comprising the steps of:

obtaining a total link number denoting a total number of signal links of a first destination exchange in the communication signal exchange system having a plurality of signal links, and a total link list of signal links;

obtaining a number of unavailable signal links of said first destination exchange;

obtaining a total number of available links of said first destination exchange by subtracting from said total link number the number of unavailable signal links;

obtaining a first link number, said first link number being a remainder resulting from dividing a signal link selection value of a signal message by said total link number;

checking whether a first link having said first link number is available;

if said first link having said first link number is available, selecting said first link as a selected link;

if said first link having said first link number is not available, obtaining a second link number, said second link number being a remainder resulting from dividing said first link number by said total number of available links, and selecting a second link having said second link number as said selected link; and outputting of a message using one of said first link and said second link as said selected link.

4. The method of claim 3, wherein said total number of signal links of the first destination exchange is variable.

5. The method of claim 4, wherein said total number of signal links of the first destination exchange is in dependence upon said communication signal exchange system.

6. The method of claim 5, wherein said selected link is used for transmitting said signal message to a destination.

7. The method of claim 3, wherein said selected link is used for transmitting said signal message to a destination.

8. The method of claim 3, wherein said communication signal exchange system further comprises a second exchange, a third exchange, and a fourth exchange.

9. The method of claim 8, wherein said second exchange and said third exchange are connected with links.

10. The method of claim 9, wherein a number of links between said second exchange and said third exchange are variable.

11. The method of claim 3, wherein said first link number is stored in a first register.

12. The method of claim 11, wherein said second link number is stored in a second register.

13. The method of claim 3, wherein during the step of obtaining a second link number the communication signal exchange system does not interrupt traffic of available links.

14. The method of claim 3, wherein a message is transmitted to an exchange of a specific destination in an exchange network of a plurality of networked exchanges.

15. The method of claim 14, wherein said message is transmitted to said exchange of said specific destination by the steps of:

dividing said message to be transmitted to said exchange of said specific destination into a plurality of divided messages; and transmitting said divided messages through a plurality of links.

16. The method of claim 3, wherein a communication load is equally divided.

17. The method of claim 3, wherein signal links are variably selected according to the number of variable signal links in said communication signal exchange system.

18. The method of claim 3, wherein signal links are variably selected according to the number of variable signal links in said communication signal exchange system when said signal message is transmitted.

19. The method of claim 3, wherein when an unavailable signal link occurs in said communication signal exchange system, selection of an available signal link is controlled by said communication signal exchange system.

* * * * *